United States Patent [19]
Ziegler

[11] 3,713,838
[45] Jan. 30, 1973

[54] PROCESS FOR OBTAINING A BEER FLAVORING

[76] Inventor: Erich Ziegler, D-8551 Aufsess/Ofr., Bavaria, Germany

[22] Filed: Dec. 31, 1970

[21] Appl. No.: 103,102

[52] U.S. Cl. .............................99/28, 99/22, 99/31, 99/53, 99/97, 99/140 R
[51] Int. Cl. ..............................................A23l 1/26
[58] Field of Search ......99/31, 53, 28, 96, 22, 140 R, 99/5, 9, 97

[56] References Cited

UNITED STATES PATENTS 2,273,853  2/1942  Fischer................................99/31
3,526,509  9/1970  Yamada et al. .........................99/30
2,364,060  12/1944  Ditto et al. ...............................99/97
3,212,902  10/1965  Bavisotto..................................99/9

Primary Examiner—Morris O. Wolk
Assistant Examiner—Stephen B. Davis
Attorney—Harness, Dickey & Pierce

[57] ABSTRACT

Beer flavoring substances are obtained from the yeast containing dregs obtained in brewing, preferably by fractional distillation or solvent extraction. The flavoring substance consists of an oil having an intensive odor and a density at 20°C ranging from about 0.85 to 0.89 and is soluble in an 80 percent ethyl alcohol solution in all ratios. The flavoring substance or an alcohol solution of the same is added to various foods and beverages.

18 Claims, 1 Drawing Figure

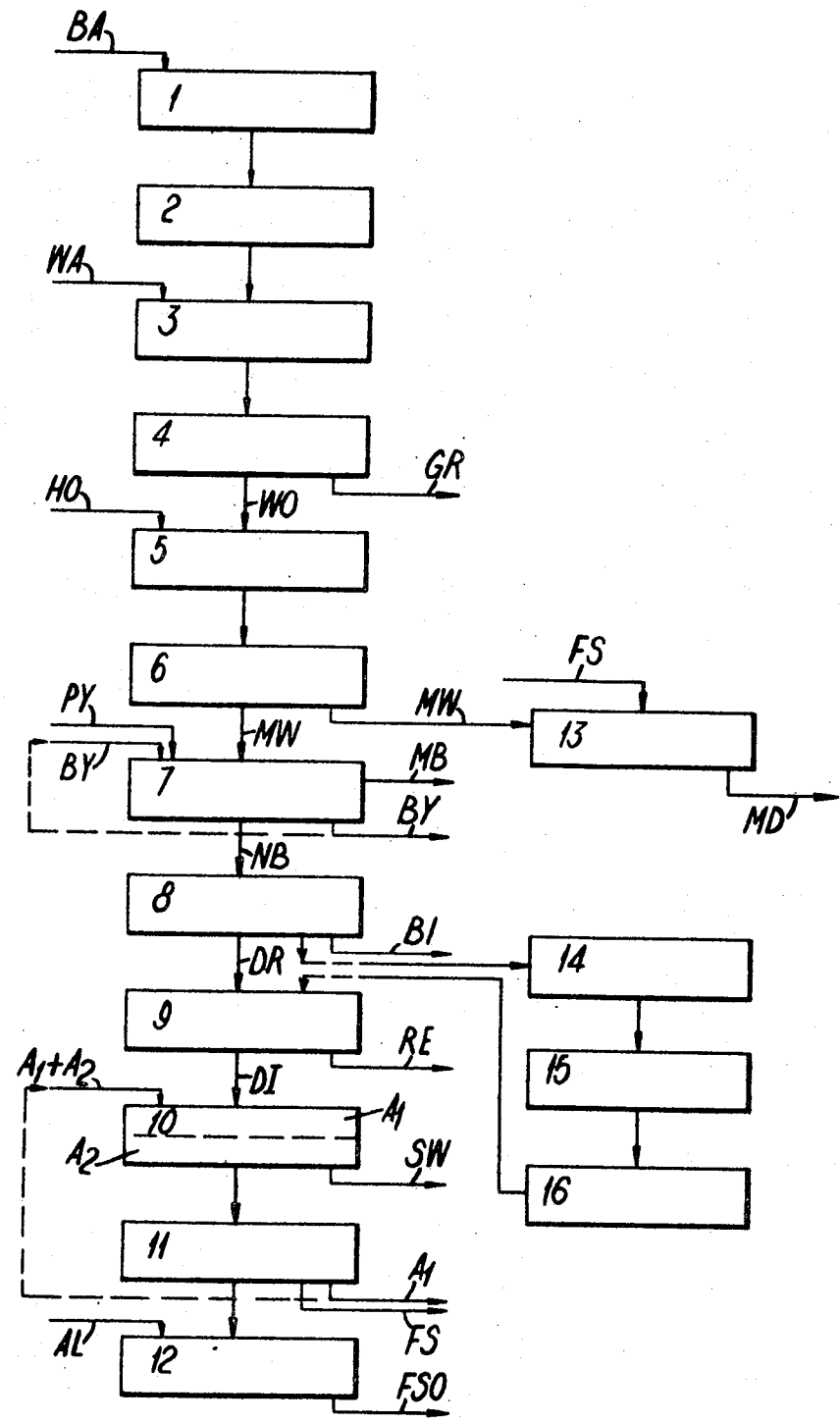

PROCESS FOR OBTAINING A BEER FLAVORING

BACKGROUND OF THE INVENTION

Beer is obtained by the known brewing process and is as a rule obtained as an alcoholic drink of high calorie content. In many cases, for example when the consumers are drivers of vehicles, the alcohol content is undesired. So-called malt beer has therefore been manufactured, in which the malt wort is only fermented very briefly, in order to achieve the typical beer flavor. By doing this, the alcohol content can be kept low, for example at or below 1 percent or 1.5 percent. Apart from the slight alcohol content still present, malt beer is however rich in calories and is, therefore, in many cases, unsuitable for consumption as a thirst-quenching drink.

The manufacture of a drink of beer-like taste, the alcohol content and calorie content of which can be adjusted as required, requires a beer flavoring, because the usual brewing process is not suitable for the manufacture of such a drink. Attempts have been made to compose such a beer flavoring by mixing various flavorings, but without any real success.

It is an aim of the invention to obtain, by simple means, a beer flavoring which possesses the typical beer taste and which is suitable for the flavoring of foodstuffs and beverages.

SUMMARY OF THE INVENTION

The invention is based on the discovery that the beer yeast waste products are substantially richer in flavoring materials than the beer itself. The flavoring substances are formed during the manufacture of the beer, primarily during the fermentation process, and pass, in considerable concentration, into the waste products.

In one aspect, therefore, the invention consists of a process for obtaining beer flavoring substances, which comprises separating from yeast-containing waste products which are obtained in brewing beer at least part of their content of beer flavoring substances.

In other aspects, it consists in beer flavoring materials which have been separated from such yeast-containing waste products, and in articles of food and drink, especially but not exclusively malt beer and soft drinks, to which such flavoring substances have been added.

The flavoring substances obtained in accordance with the invention are identical with the flavoring substances of the completely brewed beer, and therefore ideally fulfill the set requirements with respect to taste. This even extends to the point that the flavoring substances obtained according to the invention are differentiated by fine shades of taste, depending on the beer brewing process from which they have been obtained.

BRIEF DESCRIPTION OF THE DRAWING

The invention will be explained in more detail by reference to the accompanying drawing, in which the FIGURE is a flow sheet illustrating the brewing process and the recovery of beer flavoring substances from the waste products.

In the drawing, each box represents a process stage. The arrows denote the addition of starting substances, the course of the substances during processing, and the release of by-products.

DESCRIPTION OF THE PREFERRED EMBODIMENTS

Referring now to the drawing, the manufacture of beer starts from barley (BA), which is malted (1), that is to say, caused to germinate partially. The malted barley is then crushed (2), and after addition of water (WA) is mashed (3), that is to say, it is heated in certain stages and subsequently boiled. The so-called grain (GR) floats on the mashed liquid and is strained off (4), after which it can be further processed as animal fodder. Hops (HO) are added to the wort (WO) freed of the grain, which is then boiled (5), and subsequently cooled (6). The product is an alcohol-free malt wort (MW), which can find a special novel use in conjunction with the invention, as is explained below.

In the normal manufacture of beer, yeast is added to the malt wort, either pure culture yeast (PY) or brewers yeast (BY) which is obtained from the subsequent fermentation process. The malt wort treated with yeast ferments (7) to give the new beer (NB). Further brewers yeast is produced in the course of the fermentation, and can be reused for fermentation of another batch. The manufacture of so-called malt beer (MB) of low alcohol content involves prematurely stopping the fermentation process (7). In the normal manufacture of beer, that is to say when the fermentation process is taken to completion, the brewers yeast settles and is separated from the fully fermented liquid, which is stored as new beer (NB). On storage (8), suspended matter in the new beer settles and the liquid is then decanted therefrom as finished beer (BI), while the sediment remains as so-called dregs (DR). These dregs are a waste product in known processes for the manufacture of beer, which has not been utilized. However, it has now been found to contain many flavoring substances produced in the preceding fermentation, and according to the invention, they are separated from these dregs. For this purpose, the dregs may be heated in a still (9) until such of its constituents as are more volatile than water have passed over as a distillate. The residues (RE) are alcohol-free and contain water. They can be dried and used as animal fodder or fertilizer. Such use has heretofore been out of the question for the dregs, because they contained alcohol and were rich in flavoring substances, which for example made usage as animal fodder impossible.

The distillate (DI) 1 is collected in a two-layer absorber (10), containing an aqueous solution (A2) as a lower layer, and an oil, preferably paraffin oil, (A1), as the upper layer. The paraffin oil or other neutral oil may be of any type commercially available and is preferably of a boiling range that facilitates subsequent recovery of the flavor substance from the oil layer by fractional distillation under vacuum.

The oily flavoring substances are absorbed by the oily absorption layer, while the alcohol remains in the aqueous layer. To flavor the concentration of the flavoring substances in the oil layer, the aqueous layer is appropriately a highly concentrated solution (SW) of sodium chloride or any other inorganic salt or compound, such for example as acetic acid, which:

1. is water-soluble,
2. gives the aqueous solution a higher specific gravity,
3. is chemically and physically inert to the flavoring substances, and 4. is harmless and non-toxic for human consumption. The oily absorption layer is decanted from the aqueous layer and is subjected to fractional distillation (11) until the flavoring substances have largely passed into the distillate. The residual oil can be reused in the two-layer absorber (10). The distillate from the fractional distillation (11) consists of highly concentrated flavoring substances (FS) of oily consistency, which can be used directly for flavoring, but are preferably diluted (12), as by addition of pure alcohol (AL), to give a flavoring solution (FSO). The flavoring obtained following the distillation process (11) is a beer flavoring, that is to say a flavoring having the taste of beer, which is outstandingly suitable for use as the taste basis for foodstuffs and beverages, to which it is added.

As has already been mentioned, the beer flavoring thus obtained shows shades of taste, which are specific to the brewing process (1) to (8), and are the same as those found in the finished beer (BI). Thus, the invention makes it possible to flavor foodstuffs and beverages with a beer flavor, in which the shades of taste match those of the beer, by flavoring the particular foodstuffs or beverages with those flavoring substances which are manufactured from the same production sequence as the particular beer. This makes it possible to manufacture a range of foodstuffs and beverages, including beer, which all have a beer taste, which additionally possess particularly consistent specific shades of taste. Such a range of foodstuffs and beverages may, for example, include chewing gum, bakery products, soft drinks and the like.

The invention also makes it possible to manufacture a malt beer free of any alcohol content.

In the known manufacture of malt beer, the malt wort is fermented (7) so as to develop the desired beer flavoring substances in the malt wort. The fermentation is however stopped prematurely in order to keep the alcohol content as low as possible. The result is a malt beer of low alcohol content which has a beer taste which many consumers find dull because it is not intensive. The dullness is due to the fact that only a small amount of the flavoring substances can form during the short fermentation process.

The invention comprises also a different path for the manufacture of a malt drink which is alcohol-free or of low alcohol content. The production of an alcohol-free malt drink starts from the malt wort obtained following the cooling process (6), which is alcohol-free because it is as yet unfermented. To this malt wort is added (13) distillate FS obtained at (11) or flavoring solution (FSO) obtained after dilution (12). (The low alcohol content of the flavoring solution (FSO) is of no importance as regards the assessment as an alcohol-free drink of the malt drink (MD), produced by mixing it with the malt beer, because this amount of alcohol is negligible in the finished malt drink.) If, on the other hand, a malt drink of low alcohol content is required, the distillate FS or solution FSO is added to a malt beer of low alcohol content, produced by a short fermentation as already described. It is noteworthy that in contrast to the known manufacture of malt beer, the flavoring can be made as strong as is desired, by adding an appropriate amount of flavoring, so that a dull flavor can always be avoided. If a consistent taste is desired, the flavoring substances can be those which have been obtained from the same starting substances as the malt wort used, in accordance with the schematic representation in the drawing. It is, on the other hand, equally possible to add beer flavoring which originates from a different production and, therefore, possesses other shades of taste, and so to achieve new taste combinations.

In some cases, a beer flavoring is not required at the location where the dregs or other waste products arise, while, in other cases, the equipment required for obtaining the beer flavoring according to the invention is not available. In these and similar cases, the dregs can be stored for subsequent extraction of the flavoring. Since they are initially very voluminous because of their high water content, it is advisable in such cases to dry the dregs by pressing (14). It is found that when this is done, the flavoring substances largely remain in the pressed residue. The dregs dried in this way occupy considerably less volume and can, for example, be pressed into cubes (15), and stored or transported to a distillation installation some distance away. For the distillation (9), the dry dregs will then first be remoistened (16). From there onwards, they can be further treated as at 9, as previously described.

The distillation process (9) and the subsequent absorption process (11) can be carried out using apparatus which preferably comprises a distillation vessel of V 2 A-steel, which is heated with hot oil or steam through a heating jacket. The vessel has an outlet pipeline at the bottom, which can be closed by means of a valve, and is connected, via a syphon pipeline open at its free end, to an absorption vessel provided with an opening at the top, but otherwise closed. The absorption vessel contains as a lower layer, a concentrated aqueous solution of sodium chloride, and as an upper layer, paraffin oil. The aqueous layer can be cooled by cooling coils. An outlet pipeline, which can be closed by means of a vessel valve, is provided at the bottom of the absorption vessel.

For the distillation, a charge of dregs is introduced into the distillation vessel, so that the latter is about half full. The distillation is continued until essentially all volatile constituents have passed into the absorption liquids. The distillate consists essentially of oily flavoring substances and of alcohol. The alcohol mixes with the sodium chloride solution, while the oil containing the flavoring substances is dissolved in the paraffin oil layer. The residues of the dregs, which are free from alcohol, are run out of the distillation vessel by opening the appropriate valve. Similarly the sodium chloride solution containing alcohol is run out of the absorption vessel by opening the valve provided for the purpose. In this way, the paraffin oil layer containing the flavoring is separated from all other constituents. The flavoring can then be obtained from the paraffin oil layer by fractional distillation (11).

While the invention has been described with particular reference to the separation of the flavoring materials from the dregs by distillation, this can also be done by solvent extraction. For example, the dregs may be agitated with paraffin oil and the resulting solution separated and worked up by vacuum distillation to give the beer flavoring.

For further processing or use, the highly concentrated beer flavoring oil obtained as described above may be dissolved, for example in ethyl alcohol. Such a solution permits more accurate and easier dosing than the oil itself.

The chemical composition of the beer flavoring substance extracted from the dregs in accordance with the process comprising the present invention is very complex comprising a mixture of a variety of different substances. Analyses made by gas chromatography and mass spectroscopy reveals such flavoring substances or oils as containing the following groups of chemical compounds: alcohols, esters, carbonic acids, carbonyl compounds and hydrocarbons. Generally, the beer flavoring substance recovered in accordance with the practice of the present invention is similar to those beer flavoring substances present in conventional beer which are well known in the art and have been described in various technical publications.

Conventionally, the beer flavoring substance or oil has a density at 20° C. usually ranging between about 0.85 and 0.89. The oil is soluble in an 80 percent ethyl alcohol solution in all ratios. The oil is conventionally of a dark brown color and has an intensive odor. The process as herein described is applicable for recovering such flavoring substances from any one of the well known varieties of yeasts employed in beer fermentation processes including those as described in "Die Hefen" (Yeasts), Volumes 1 and 2, 1960, Neurnberg, Germany.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. Process for obtaining beer flavoring substances, which comprises separating from yeast-containing waste products which are obtained in brewing beer at least part of their content of beer flavoring substances, said substances consisting essentially of an oil having an intensive odor and a density at 20°C. ranging from about 0.85 to about 0.89, said oil further characterized as being soluble in an 80 percent ethyl alcohol solution in all ratios.

2. Process according to claim 1, wherein the beer flavoring substances are separated from the waste products by fractional distillation.

3. Process according to claim 1, wherein the beer flavoring substances are separated from the waste products by solvent extraction.

4. Process according to claim 2, wherein the beer flavoring substances are separated by fractional distillation from the dregs, while the latter are in the state of high water content in which they are separated from the new beer.

5. Process according to claim 2, wherein the dregs, in the state of high water content in which they are separated from the new beer, are pressed to remove a large part of their water content, and further water is added before the flavoring substances are removed from the dregs by distillation.

6. Process according to claim 2, wherein the fractional distillation is continued until substantially all constituents more volatile than water have been transferred to the distillate, the distillation is then stopped, and the distillate is collected in an absorption liquid consisting of at least two layers, one aqueous and the other oily, in which the flavoring substances are separated from alcohol.

7. Process according to claim 6, wherein the aqueous layer contains a water-soluble substance which increases its specific gravity, is chemically inert towards the flavoring substances, and is harmless for human consumption.

8. Process according to claim 7, wherein the said water-soluble substance is sodium chloride.

9. Process according to claim 6, wherein the oily layer containing flavoring substances is separated from the aqueous layer by decantation, and the flavoring substances are separated therefrom by fractional distillation.

10. Process according to claim 9, wherein the oily residue from the frictional distillation of the oily layer is re-used as absorption liquid.

11. Process according to claim 3, wherein paraffin oil is used as the extracting solvent, and the beer flavoring substances are separated from the extract by fractional distillation in vacuo.

12. Process according to claim 9, wherein the final distillate comprising the beer flavoring substances is diluted with alcohol to give a ready-to-use solution.

13. Process according to claim 11, wherein the final distillate comprising the beer flavoring substance is diluted with alcohol to give a ready-to-use solution.

14. Foods and beverages containing beer flavoring substances which have been obtained from waste products obtained in brewing beer, said flavoring substances consisting essentially of an oil having an intensive odor and a density at 20°C. ranging from about 0.85 to about 0.89 said oil further characterized as being soluble in an 80 percent ethyl alcohol solution in all ratios.

15. Foods and beverages containing beer flavoring substances which have been obtained by fractional distillation from the yeast-containing dregs produced in brewing, said substances consisting essentially of an oil having an intensive odor and a density at 20°C. ranging from about 0.85 to about 0.89, said oil further characterized as being soluble in an 80 percent ethyl alcohol solution in all ratios.

16. Foods and beverages containing beer flavoring substances which have been obtained by solvent extraction from the yeast-containing dregs produced in brewing, said substances consisting essentially of an oil having an intensive odor and a density at 20°C. ranging from about 0.85 to about 0.89, said oil further characterized as being soluble in an 80 percent ethyl alcohol solution in all ratios.

17. Beverages according to claim 14, having a low or zero alcohol content.

18. A beverage according to claim 17, being a malt beer of low or zero alcohol content.

* * * * *